United States Patent [19]

Goldmacher et al.

[11] 3,809,456
[45] May 7, 1974

[54] LIQUID CRYSTAL DEVICE
[75] Inventors: Joel E. Goldmacher, West Windsor Township, Mercer County; Miguelita G. Tayag, East Windsor Township, Mercer County, both of N.J.
[73] Assignee: Optel Corporation, South Brunswick Township, N.J.
[22] Filed: Apr. 10, 1972
[21] Appl. No.: 242,467

[52] U.S. Cl............................ 350/160 LC, 252/408
[51] Int. Cl............................................. G02f 1/16
[58] Field of Search....... 350/160 LC, 150; 252/408

[56] References Cited
UNITED STATES PATENTS

| | | | |
|---|---|---|---|
| 3,728,008 | 4/1973 | Allan et al. | 350/160 LC |
| 3,674,341 | 7/1972 | Hedman, Jr. et al. | 350/160 LC |
| 3,656,834 | 4/1972 | Haller et al. | 350/150 |
| 3,687,515 | 8/1972 | Haas et al. | 350/150 |
| 3,694,053 | 9/1972 | Kahn | 350/150 |
| 3,499,112 | 3/1970 | Heilmeier et al. | 350/160 LC X |
| 3,674,338 | 7/1972 | Cartmell et al. | 350/160 LC X |
| 3,675,987 | 7/1972 | Rafuse | 350/160 LC |

OTHER PUBLICATIONS

Haller et al.: "Aligning Nematic Liquid Cryistals," IBM Tech. Disc. Bull., Vol. 13, pg. 3,237, April 1971.
Wagner: "Substrate Treatment for Liquid Crystal Display," IBM Tech. Disc. Bull., Vol. 13, p. 2961, March, 1971.
Osipow: Surface Chemistry, Reinhold Pub. Co. 1962, pp. 144-145.

Primary Examiner—Edward S. Bauer
Attorney, Agent, or Firm—Joel F. Spivak

[57] ABSTRACT

A liquid crystal display device comprises a liquid crystal composition sandwiched between electrodes, at least one electrode being transparent. The liquid crystal device includes an aligning agent to improve the contrast ratio of the display and doping agents to adjust the conductivity of the liquid crystal composition.

6 Claims, 2 Drawing Figures

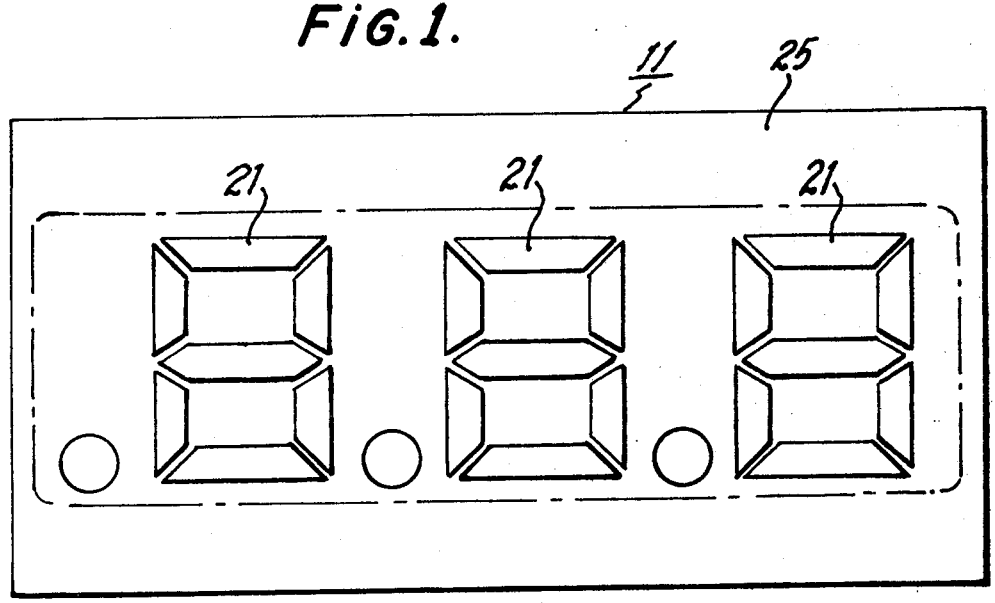
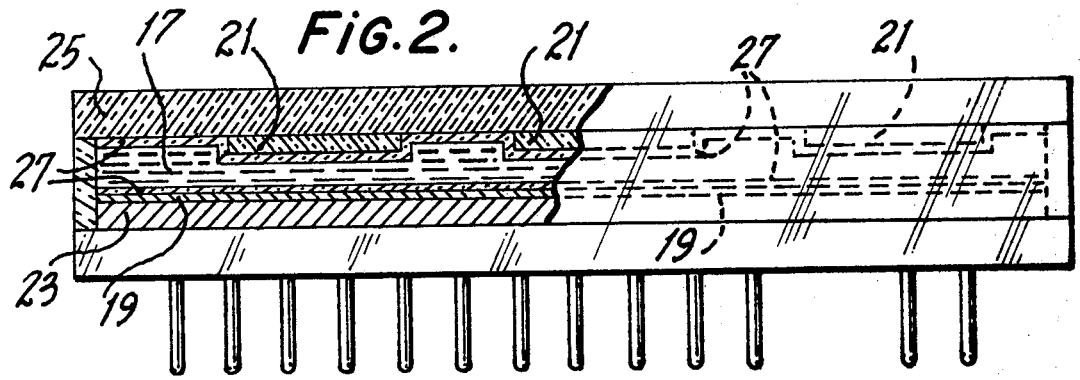

LIQUID CRYSTAL DEVICE

BACKGROUND OF THE INVENTION

This invention relates to liquid crystal devices and particularly to a liquid crystal device which includes an aligning agent and a conductivity doping agent for the liquid crystal materials.

In recent years many articles have appeared and many patents have issued describing liquid crystal materials and devices. Examples of articles in the field include "Electric-Field Induced Texture Transformation and Pitch Concentration in a Cholesteric Liquid Crystal," *Molecular Crystals and Liquid Control*, 15, 257 (1971), and articles concerning nematic liquid crystals found in *J. Chem. Phys.* 44, 638 (1966), Proceedings IEEE 57, 34 (1969). Some of the patents relating to liquid crystal technology include: U.S. Pat. Nos. 3,499,112; 3,551,020; 3,540,796 and 3,499,702.

A typical liquid crystal device useful as a display, such as a numeric indicator, consists of a liquid crystal display cell and driving and logic circuitry associated therewith. The display cell comprises a thin layer of a liquid crystal composition between two parallel electrodes, at least one of which is segmented. In any area of the liquid crystal composition to which an activating voltage is applied, the optical properties of the composition are altered, thereby modulating light passing therethrough or impinging thereon. Generally, light modulation occurs due to either a. a change in the light scattering properties of the liquid crystal material which may be caused by
   i. orientation of the rod-like liquid crystal molecules or
   ii. random motion of the molecules generally in the form of clusters or due to
b. the rotation of the plane of polarization of light passing therethrough, upon the application of the activating voltage thereto.

Typically, thin layers of a liquid crystal composition which modulates light due to a change in the light scattering properties changes in appearance from essentially transparent to white when activated. However, materials are known which appear white in the absence of an applied voltage and become clear upon the application of an activating voltage. Devices which operate based upon a change in the direction of polarization require the display cell to be placed between polarizers when operating with white light. These cells can be made to change, for example, from clear to dark or vice versa.

An inherent difficulty of liquid crystal cells is that the liquid crystal molecules, in the absence of an applied signal, are generally randomly oriented causing a certain amount of premature light scattering. This initial or premature light scattering acts to decrease the maximum attainable contrast ratio of the device. It would be desirable, in order to increase the contrast ratio of these devices, to align or orient the liquid crystal molecules, in the absence of an activating signal, so that their long axes are perpendicular to the electrode surface (essentially parallel to the direction of light impinging on the device), thereby minimizing the initial amount of light scattering. This alignment, however, must be accomplished in a manner or with materials which are non-reactive with the liquid crystal materials.

Similarly, in devices which operate due to the rotation of the plane of polarization, the contrast ratio of these devices can be improved if the liquid crystal molecules could be initially aligned in a particular direction to reduce unwanted rotation of the plane of polarization in the absence of an activating signal.

We have discovered useful aligning agents which increase the contrast ratio of the liquid crystal device without any measurable detrimental effects to the life or character of the display device.

In liquid crystal display devices which operate due to light scattering caused by the random motion of molecular clusters under the influence of an activating signal, it is necessary to adjust the resistivity of the display cell. In order to obtain maximum cell life and minimum power consumption, it is preferred that the resistivity of the cell be in the order of $10^{11}$ ohm-cm. (This value is dependent upon the operating frequency of the device.) However, in order to obtain maximum light scattering and hence maximum brightness and contrast from the display, resistivities in the order of $10^9$ ohm-cm are preferred. It has been found that the best compromise for practical, commercially useful devices, is to adjust the resistivity of the cell to in the order of $10^{10}$ ohm-cm. It has further been found that in order to obtain reproducible results which result in high contrast long-lived cells, it is preferred that the liquid crystal material first be purified such that its resistivity is greater than $10^{11}$ ohm-cm. and that the pure material be doped with non-reactive ionic doping agents which increase the conductivity of the cell to the desired values. U.S. Pat. No. 3,499,112 discloses the use of dodecylisoquinolium bromide, a quaternary ammonium salt, as an ionic dopant. We have discovered several new doping agents useful for controlling the conductivity which are non-reactive with the liquid crystal compounds and when incorporated in the cells result in high contrast, long-lived cells which can be made with good reproducibility.

SUMMARY OF THE INVENTION

An electro-optical display device comprises a liquid crystal display cell comprising spaced, parallel support plates having electrodes thereon, at least one liquid crystal compound between said electrodes and at least one aligning agent between said electrodes, said aligning agent selected from the group consisting of long chain carboylic acids, long chain alcohols, ureas and silanes. The aligning agent may be present in a concentration of from as little as a monolayer on the surface of an electrode to up to 2 percent in the liquid crystal material.

BRIEF DESCRIPTION OF THE DRAWING

FIG. 1 is a plan view of a liquid crystal digital display; and

FIG. 2 is an elevational, partially crosssectional view of the device of FIG. 1.

DETAILED DESCRIPTION OF THE INVENTION

A liquid crystal reflective numeric display device 11 is shown in FIG. 1. The display, when provided with an activating voltage, typically 15 volts, and conventional digital control and logic circuits, will display arabic numerals corresponding to digital control signals. The display illustrated includes, by way of example, three decimal digits and controllable decimal points for display of numbers from 0.001 through 999.

The display device 11 comprises a display cell 13 and a logic module 15. The display cell consists of a thin layer, typically 6–25 $\mu$, of a normally essentially transparent liquid crystal material 17 between a unitary electrode 19 and a plurality of segmented electrodes 21. The electrodes 19 and 21 are in the form of coatings upon support plates 23 and 25, respectively. Electrodes 21 are at the front of the device and are transparent. A preferred transparent electrode is indium oxide. Similarly, the front support plate 25 is transparent. The electrodes 19 and 21 and the glass support plate 25 are shown as having a coating 27 thereon. This coating which may be as thin as a monolayer causes preferential alignment of the liquid crystal molecules in the absence of an activating voltage. The aligning agent may be incorporated into the liquid crystal composition and then allowed to coat the surface of the support plate and electrodes, or one may first treat these surfaces with the aligning agent in the absence of the liquid crystal material to form a thin coating of aligning agent on these surfaces.

The aligning agent, to be useful, should have several specific properties. Among these properties are: (i) the ability to bond to the surfaces of the support plate and the electrodes; (ii) the ability to impart a surface characteristic to the support plate and electrodes so as to cause preferential alignment of the axes of the liquid crystal molecules in the display cell (that is, to decrease wetting of the surface by the liquid crystals); and (iii) a chemical inertness with the liquid crystal compounds. In addition, the aligning agent should be transparent, at least with respect to the quantity employed in the cell. It also is preferred that the aligning agent should not substantially contribute to the conductivity of the cell. In this way, the aligning agent can be useful in high resistivity liquid crystal cells as well as liquid crystal cells that operate by dynamic scattering and utilize resistivities in the order of $10^{10}$ ohm-cm.

Preferred aligning agents have the combination of strong aligning effects, causing alignment of the axes of the liquid crystal molecules either perpendicular to the surface of the electrodes or with a preferred twist of the molecules, and of forming strong chemical bonds with the oxide surfaces of the glass and the electrodes rather than weak Van der Waal type bonds which are easily disrupted and broken.

We have discovered that preferred aligning agents having the aforementioned properties may be selected from long chain carboxylic acids, long chain alcohols, long chain ureas, and long chain silanes. These agents result in the best alignment and do not react with the liquid crystal material. Long chain carboxylic acids and silanes are the most preferred group as these agents form strong chemical type bonds with the surfaces of the glass and electrodes.

Examples of specific useful aligning agents include p-n-octyloxybenzoic acid, dodecanol, n-hexadecyl urea, and dodecyltriethoxy silane. Generally, preferred chain lengths are from four to eighteen carbonatoms. Wetting and adhesion to the surface is generally hampered with increasing chain length, thereby causing the liquid crystal to allign homeotropically.

The addition of the aligning agent to the device increases the attainable contrast ratio as compared with similar devices which do not incorporate the novel aligning agents. In a typical light-scattering type of electro-optical cell, in the absence of an applied signal to the electrodes, the liquid crystal cell appears highly transparent and upon application of a voltage the material appears milky white in the region of activated segments. Thus, the contrast ratio of the device is improved. A similar increase in contrast ratio is observed in devices employing liquid crystal which affect a change in transmission or reflection of polarized light.

Suitable construction for the display devices are known, and since the particular form of the device is not critical to the present invention, this construction is not here described in detail.

Novel cells which operate by way of cluster motion, commonly dynamic scattering, include doping agents for adjusting the conductivity of the cell as well as aligning agents. We have successfully prepared wide temperature range nematic liquid crystal devices with high contrast ratios which require only 20–30 $\mu$ watts/cm$^2$ when operated at 15 volts and 32–64 Hertz.

The nematic liquid crystals of these devices are purified to a resistivity of from $10^{12}$–$10^{14}$ ohm-cm before doping. After attaining this purity, the materials are then doped with an electrolyte, generally from 0.1 to 0.001 wt. percent, until the desired resistivity is attained. Typically, resistivities of from $10^9$ to $5 \times 10^{10}$ are preferred. We have found that quaternary phosphonium salts and quaternary arsonium salts, such as quaternary phosphonium halides and quaternary arsonium halides are preferred electrolytes.

The quaternary phosphonium and quaternary arsonium salts are preferred over the prior art quaternary salts due to the fact that the ammonium salts are basic and react with many of the aligning agents often forming a precipitate or other undesirable product and destroying the aligning agent. The quaternary phosphonium and quaternary arsonium salts, on the other hand, are stable in the presence of the aligning agents and are nonreactive therewith.

A further advantage of the quaternary phosphonium and quaternary arsonium salts is that they are more easily obtainable in high purity than the quaternary ammonium salts. Also, the halides of the novel dopants can be prepared easily from the direct reaction of phosphines or arsines with the appropriate alkyl halide.

A typical device would comprise a 12 $\mu$ thick layer of a nematic liquid crystal mixture of for example, p-methoxybenzylidene-p'-butylaniline and p-ethoxybenzylidene-p'-butylaniline containing 2 wt. percent p-octyloxybenzoic acid as an aligning agent and 1 $\times 10^{-3}$ wt. percent of tetraphenyl arsonium chloride or triphenylheptylphosphonium bromide. At 15 V, 32 Hz this device shows uniform dynamic scattering while utilizing only 2 $\mu$ amperes of current/sq.cm.

What is claimed is:

1. An electro-optical display device comprises a liquid crystal display cell comprising spaced parallel support plates having electrodes thereon, a liquid crystal material and a liquid crystal aligning agent between said electrodes, said aligning agent having substantially no effect on the conductivity of the liquid crystal cell and wherein said aligning agent is n-hexadecyl urea in a concentration of from a monolayer to 2 weight percent.

2. An electro-optical device of the light scattering type comprising a nematic liquid crystal display cell having essentially parallel spaced support plates for the electrodes thereon and a nematic liquid crystal composition between said electrodes, said cell consisting of, in addition to said liquid crystal composition, an aligning agent having substantially no effect on the conductivity of the liquid crystal cell and selected from the group consisting of long chain p-alkoxybenzoic acids, and an ionic dopant in said liquid crystal composition selected from the group consisting of quaternary phosphonium salts and quaternary arsonium salts.

3. The device recited in claim 2 wherein said dopant decreases the resistivity of said liquid crystal cell from greater than $10^{11}$ ohm-cm to from $10^9$ to $5 \times 10^{10}$ ohm-cm.

4. The device recited in claim 2 wherein said dopant comprises from 0.1 to 0.001 weight percent of the liquid crystal composition.

5. The device recited in claim 2 wherein said salts are the respective halides.

6. The device recited in claim 2 wherein said ionic dopant is selected from the group consisting of tetraphenyl arsonium halides and triphenylheptyl phosphonium halides.

* * * * *